US008204473B2

(12) United States Patent
Mathis et al.

(10) Patent No.: US 8,204,473 B2
(45) Date of Patent: Jun. 19, 2012

(54) METHOD AND APPARATUS FOR SELECTIVELY DISTRIBUTING MEDIA INPUTS ASSOCIATED WITH AN INCIDENT

(75) Inventors: James E. Mathis, Barrington, IL (US); Lin Lin, Fox River Grove, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 305 days.

(21) Appl. No.: 12/642,128

(22) Filed: Dec. 18, 2009

(65) Prior Publication Data

US 2011/0151825 A1 Jun. 23, 2011

(51) Int. Cl.
*H04M 11/04* (2006.01)

(52) U.S. Cl. .................................................... 455/404.1

(58) Field of Classification Search ............... 455/404.1, 455/466, 450, 404.2, 414.1–414.4, 419, 421, 455/423, 427, 431, 445, 458; 379/45; 370/352
See application file for complete search history.

(56) References Cited

U.S. PATENT DOCUMENTS

| | | | | |
|---|---|---|---|---|
| 5,724,983 | A | 3/1998 | Selker et al. | |
| 2007/0168874 | A1 | 7/2007 | Kloeffer et al. | |
| 2008/0133913 | A1 | 6/2008 | Heelan et al. | |
| 2008/0288502 | A1 | 11/2008 | Coley et al. | |
| 2009/0275350 | A1* | 11/2009 | Poremba | 455/466 |
| 2010/0261448 | A1* | 10/2010 | Peters | 455/404.1 |
| 2011/0064205 | A1* | 3/2011 | Boni et al. | 379/45 |
| 2011/0151826 | A1* | 6/2011 | Miller et al. | 455/404.1 |

OTHER PUBLICATIONS

FATPOT Technologies, Solutions > FATPOT Web Instant Notification System (WINS), http://www.fatpot.com/content/index.asp?page=104, webpage.

PCT International Search Report Dated Aug. 30, 2011 for Counterpart Application.

* cited by examiner

*Primary Examiner* — Melody Mehrpour
(74) *Attorney, Agent, or Firm* — Valerie M. Davis; Kenneth A. Haas

(57) ABSTRACT

An information distribution device performs a method for selectively distributing media associated with an incident to a plurality of responders assigned to the incident. The method includes receiving, at the information distribution device, an incident information bundle comprising media inputs associated with the incident. For each responder in the plurality of responders assigned to the incident, the information distribution device: determines a set of roles for the responder; selects a set of filtering templates designed based on the set of roles; applies the set of filtering templates to the information bundle to generate a responder information bundle that includes a subset of the media inputs that is customized to the set of roles for the responder; and delivers the responder information bundle to the responder.

13 Claims, 2 Drawing Sheets

METHOD AND APPARATUS FOR SELECTIVELY DISTRIBUTING MEDIA INPUTS ASSOCIATED WITH AN INCIDENT

FIELD OF THE DISCLOSURE

The present disclosure relates generally to information processing and distribution and more particularly to selectively distributing media inputs, associated with an incident, to designated people.

BACKGROUND

In public safety emergency situations such as a natural calamity, fire, riots, terror attacks, etc., disaster management agencies receive a large and varied amount of information associated with an incident from a plurality of information sources. Such information can include descriptive text (e.g., medical information), images (e.g., floor plans), video clips (e.g., building entry video), live surveillance video, and the like. Generally, a data management system collects such information or references to the information sources. The data management system then sends the information to a designated group of people, referred to as responders, assigned to the incident.

Such enormous amount of information may easily overwhelm the responders and can distract the responders from their primary mission. Moreover, external information sources are generally not allowed to send relevant information directly to the responders as the management agencies may also want to shield the identity and address of the responders from the external sources, especially from non-governmental entities. Therefore, the responders are often left unaware of additional information that might help them to tackle the situation efficiently.

Accordingly, there is a need for a method and apparatus for selectively distributing media inputs associated with an incident to the responders assigned to the incident.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
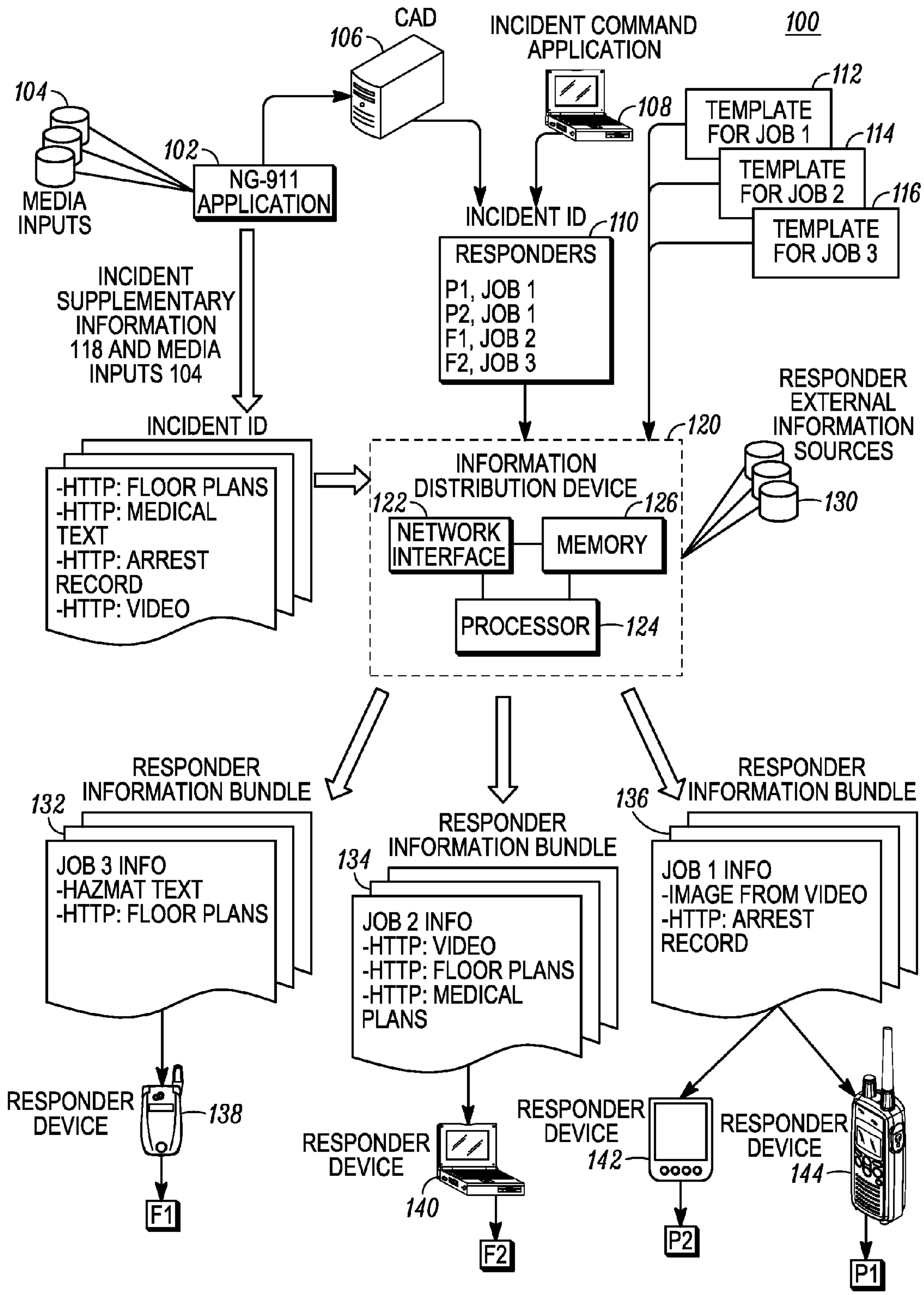
FIG. 1 is a block diagram of a system for selectively distributing media associated with an incident to the responders assigned to the incident in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present disclosure is directed to a method for selectively distributing media inputs associated with an incident to a plurality of responders assigned to the incident. As the term is used herein, "media inputs" includes media (e.g., audio, text data, pictures, video clips, streaming video, etc.), references to access the media (e.g., via Universal Resource Identifiers/Locators, etc.) and/or supplemental information associated with the media.

In accordance with an embodiment, an information distribution device receives an incident information bundle including a plurality of media inputs associated with the incident. The information distribution device determines a set of roles for each responder assigned to the incident. Then, the information distribution device selects a set of filtering templates designed based on the set of roles. Thereafter, the information distribution device applies the set of filtering templates to the information bundle to generate a responder information bundle comprising a subset of the media inputs that is customized to the set of roles for the responder. The information distribution device then delivers the responder information bundle to the responder.

Referring now to the figures, FIG. 1 is a block diagram of a system 100 for selectively distributing media associated with an incident to the responders assigned to the incident. The system 100 includes several devices and entities involved in delivering, handling, and processing a vast amount of information during an incident, for instance, of public emergency or crisis. The following disclosure is described by reference to an example of a terror attack at multiple locations in a city. However, it is to be understood that the system and method disclosed are herein well applicable in many other situations and incidents.

A public emergency communication service, such as 9-1-1 in the United States of America, serves a crucial role during an emergency incident such as a terror attack. In one implementation, the system 100 is centered a Next Generation 9-1-1 (NG-911) service infrastructure, which is aimed at updating the 9-1-1 public service infrastructure in the United States and Canada to improve public emergency communications services in a wireless mobile society. The system 100 includes an NG-911 application 102 that is capable of receiving media inputs 104 from several sources reporting the terror attack. The NG-911 application 102 is basically a public communication infrastructure that provides a unified platform to report any information regarding the attack. The media inputs 104 include information received in and associated with 'Request For Assistance (RFA)' calls by the public through the NG-911 service infrastructure. The media inputs 104 can, for example, include various media such as, but not limited to, audio, text data, pictures, video clips, streaming video, etc., or a combination of these.

On receiving a RFA and corresponding media inputs 104 for an incident, the NG-911 application 102 determines whether the incoming request and media inputs are for a new incident or for an on-going incident. If the inputs 104 are for a new incident, the NG-911 application 102 assigns an incident ID and creates an associated master record for the incident, which includes the media inputs 104, and, optionally, references to received media and/or other supplementary information 118 such as pre-stored text messages for various responders, wind speed/direction information, or metadata related to the media such as the time the media was recorded and if there were alarms, when the alarms were triggered. However, if the NG-911 application 102 determines that the media inputs relate to an on-going incident, the NG-911 application 102 retrieves the master incident ID assigned to the incident and the corresponding master record for the incident ID updates the master record with the received media inputs and media references and incident supplementary information 118, if such items were generated.

The NG-911 application 102 collates all received media inputs 104 and forms what is termed herein as an "incident information bundle", and which generally means media inputs provided from any source to an information distribution device 120 (described in more detail below). In an embodiment, the incident information bundle is encoded using XML (Extensible Markup Language) to associate semantic meaning to each data item and to provide a tagging mechanism for filtering. Then, the NG-911 application 102 delivers the incident information bundle, along with the incident ID, to a CAD (Computer-Aided Dispatch) application 106 or an incident command application 108, and to an information distribution device 120.

The CAD application 106 or the incident command application 108 generates a list of responders 110 that identifies responders assigned to the incident and a set of roles or jobs for each responder. The list of responders 110 is generated based on the type of incident and capabilities of the responders. For example, in the case of a terror attack, the list of responders 110 can include responders such as chief police officers P1, P2, and fire department personnel F1, F2. The responders P1 and P2 are assigned with job 1 that involves delegating police force at various locations and keeping a tight check on the situation. The responder F1 is assigned with job 2 that involves coordinating with the fire control team, while the responder F2 is assigned with job 3 that involves rescue operation of people stranded on high-rise buildings in affected locations.

The CAD application 106 provides the list of responders 110 to the information distribution device 120. Each responder job has, associated therewith, an information filter or template that describes the type of information that is most valuable to accomplish a given task, and the preferred form of the information. In an embodiment, templates may be patterns to be used by a pattern matcher or may be executable scripts to provide for more complex filtering and bundle creation logic. The templates may also be based on the incident type and location. Examples of templates based on incident types include floor plans for fire responders, prior arrest records for police responders and medical records for EMS responders. Examples of templates based on location include providing sea conditions for responders on or near large bodies of water or providing chemical plume information to all responders, regardless of role or job or incident, in the path of a plume.

The information distribution device 120 intakes respective templates for each job, such as template 112 for job 1, template 114 for job 2, and template 116 for job 3. Apart from the media inputs 104 and supplementary information 118 provided by the NG-911 application 102, the information distribution may also obtain additional media inputs from external information sources 130 which then become part of the "incident information bundle" received at the information distribution device, which is filtered or processed (as explained below) by the job-specific templates 112-116.

In an embodiment, the information distribution device 120 includes a network interface 122, a processor 124, and a memory 126 that are operatively coupled, and which when programmed (for example via a computer-readable storage element having computer readable code stored thereon) form the means for the information distribution device 120 to implement its functionality. The network interface 122 enables the information distribution device 120 to receive and transmit data to other device and entities in the system 100. The implementation of the network interface 122 depends on the particular type of network, i.e., wired and/or wireless, to which the information distribution device 120 is connected. For example, where the network supports wired communications, the interface 122 may comprise a serial port interface (e.g., compliant to the RS-232 standard), a parallel port interface, an Ethernet interface, a USB interface, and/or a FireWire interface, and the like.

Where the network supports wireless communications, the interface 122 comprise elements including processing, modulating, and transceiver elements that are operable in accordance with any one or more standard or proprietary wireless interfaces, wherein some of the functionality of the processing, modulating, and transceiver elements may be performed by means of the processing device 124 of the information distribution device 120 through programmed logic such as software applications or firmware stored on the memory device 126 of the communication device.

The memory 126 can include various long/term and short/term storage at least of the incident ID, the list of responders 110, and the media inputs received from the NG-911 application 102 and the external information sources 130, along with and other data and information needed for the proper functioning of information distribution device 120.

Besides the above-mentioned functionality, implemented via programmed logic or code, the processing device 124 of the information distribution device 120 is further programmed with logic or code for creating responder information bundles 132-136 by using the templates 112-116 for different jobs for the responders P1, P2, F1. F2. Based on information filters included in the templates 112-116 (responder role, type and location), the processor 124 processes the media inputs received from the NG-911 application 102 and the external information sources 130. In one illustrative implementation, the templates 112-116 direct: a reordering of the information in the incident information bundle (e.g., placing the most relevant information for a given job at the top); an elimination of unnecessary or distracting information; and conversion of information from one form or format to another. Thus, each responder information bundle 132-136 includes information that is a subset of the media inputs included in the received incident information bundle.

In an embodiment, the information distribution device 120 also determines capabilities of a device (e.g., responder devices 138, 140, 142, 144) used to receive a responder information bundle and customizes each subset of media inputs to match the capabilities of the device. For example, the information distribution device 120 can determine the capabilities of the responder device 138 carried by the responder F1. On determining that the responder device 138 is a mobile phone with no support for video playback, the information distribution device 120 excludes video files from the subset of the media inputs before being included in the responder information bundle 132. The information distribution device 120 can also transform the format of one or more media inputs to meet the capabilities of the device. For example, if the responder device 138 does not support video files, but an inputted video file includes some crucial information, then the information distribution device 120 can extract key scenes from the video file and can provide them as a set of images to the device. Other examples of media input transformation includes, changing encoding type, speech recognition to convert audio to text, delivering a reference to a particular media or media source, to name a few.

After generating the responder information bundles 132-136, the information distribution device 120 delivers the responder information bundles 132-136 to the responders F1, F2, P1, P2 via the responder devices 138-144. It is to be understood the responder devices 138-144 can be any standard communication devices such mobile phones, laptops, computers, PDAs, push-to-talk radios, and the like.

After reviewing the filtered information in the responder information bundles 132-136, the responders may determine a need to retrieve additional information. If required, the responders can initiate a request for additional information to the information distribution device 120. As new media inputs are received by the information distribution device 120 to update the information about an on-going incident, the information distribution device 120 determines the information that has changed, and accordingly filters and/or transforms the new information and forward updates to the responders in new responder information bundles.

Figure 2:
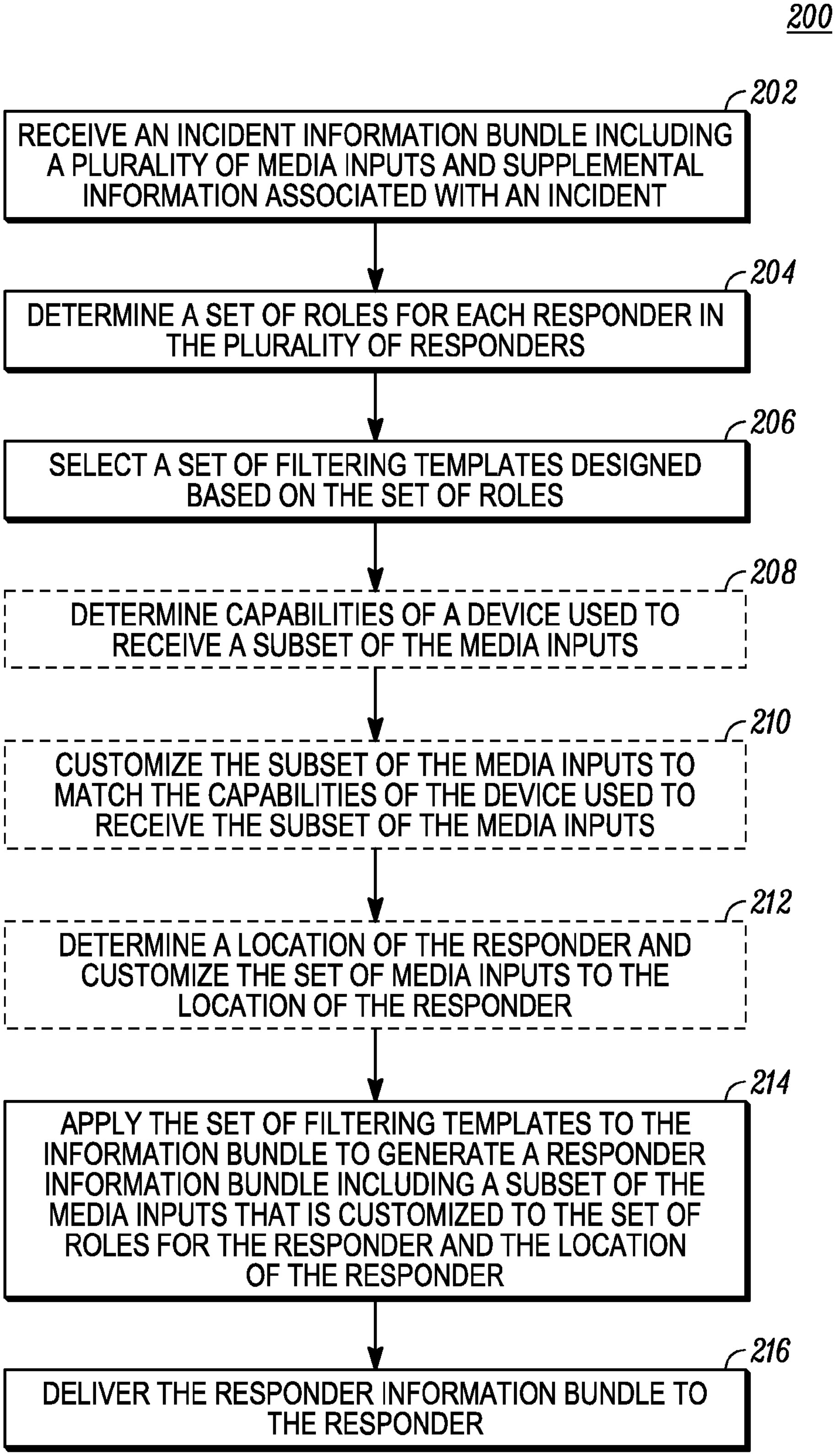
FIG. 2 is a flowchart of a method for selectively distributing media associated with an incident to the responders assigned to the incident in accordance with some embodiments.

Referring now to FIG. 2, an illustrative flowchart of a method 200 for selectively distributing media associated with an incident to the responders assigned to the incident is shown. The method 200 is applicable to the system 100 of FIG. 1 and is explained with reference to devices and entities in FIG. 1. In an embodiment, the information distribution device 120 receives (202) an incident information bundle including the media inputs 104 and supplementary information 118 from the NG-911 application 102 and media inputs, if available, from information sources 130. The information distribution device 120 also receives an incident ID associated with the incident, along with the information bundle, from the NG-911 application 102.

The CAD application 106 determines (204) a list of responders to be assigned to the incident along with a set of roles for each of the responders. The CAD application 106 determines the roles for the responders based on the media inputs 104 received from the NG-911 application 102. The NG-911 application 102 also provides the incident type, such as fire outbreak, terror attack, riots, and the like, to enable the CAD application 106 to determine the roles effectively. The CAD application 106 then provides the list of the responders 110 along with their set of roles to the information distribution device 120. In an alternate embodiment, the CAD application 106 is included in the information distribution device 120. In yet another embodiment, the CAD application 106 is included in the NG-911 application 102.

The information distribution device 120 selects (206) a set of filtering templates designed based on the set of roles for the responders. For instance, the information distribution device 120 selects the template 112 designed for job 1 assigned to the responders P1 and P2, the template 114 designed for job 2 assigned to the responder F1, and the template 116 designed for job 3 assigned to the responder F2.

In one embodiment, the information distribution device 120 determines (208) capabilities of a device used to receive a subset of the media inputs from the incident information bundle. After determining the capabilities of the device, the information distribution device 120 customizes (210) the subset of the media inputs to match the capabilities of the device. Customizing the subset of media inputs includes changing the format of at least one media input in the subset to a format that is compatible with the capabilities of the device prior to delivering the subset of the media inputs to a responder. Further, the information distribution device 120 applies the capabilities of the device to the incident information bundle to exclude those media inputs from the subset that are not compatible with the capabilities of the device. For example, exclusion of video files from the subset of media inputs to be delivered to the responder F1 via the responder device 138.

In another embodiment, the information distribution device 120 determines (212) the location of the responders and customizes a subset of media inputs to the location of the responders. For example, on determining that the responder F2 is present near an affected building, the information distribution device 120 can customize the subset of the media inputs for the responder F2 by including images and live videos showing interiors of the affected building.

After selecting the set of filtering templates, the information distribution device 120 applies the set of filtering templates to the incident information bundle to generate a responder information bundle including a subset of the media inputs that is customized to the set of roles for the responder and the location of the responder. For instance, the information distribution device 120 generates the responder information bundle 132 customized for the responder F2 assigned with job 3. Similarly, the information distribution device 120 generates the responder information bundles 134 and 136 for the responders F1, and P1, P2 respectively. Thereafter, the information distribution device 120 delivers (216) the generated responder information bundles 132-136 to the responders F2, F1, P2, P1 via their respective responder devices 138-144.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term “coupled” as used herein is defined as connected, although not necessarily directly and not necessarily mechanically. A device or structure that is “configured” in a certain way is configured in at least that way, but may also be configured in ways that are not listed.

It will be appreciated that some embodiments may be comprised of one or more generic or specialized processors (or “processing devices”) such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for selectively distributing media inputs associated with an incident to a plurality of responders assigned to the incident, the method comprising:

at an information distribution device:

receiving an incident information bundle comprising a plurality of media inputs associated with the incident, wherein the incident comprises a natural calamity, a fire, riots, or a terror attack;

for each responder in the plurality of responders assigned to the incident:

determining a role for the responder, wherein the role comprises a particular job for a police officer or comprises a particular job for a fire department personnel;

selecting a set of filtering templates designed based on the set of roles;

applying the set of filtering templates to the information bundle to generate a responder information bundle comprising a subset of the media inputs that is customized to the set of roles for the responder; and delivering the responder information bundle to the responder, wherein the responder comprises a police officer or fire department personnel.

2. The method of claim 1 further comprising:

for each responder in the plurality of responders:

determining capabilities of a device used to receive the subset of the media inputs; and customizing the subset of the media inputs to match the capabilities of the device used to receive the subset of the media inputs.

3. The method of claim 2, wherein customizing the subset of the media inputs to match the capabilities of the device used to receive the subset of the media inputs comprises changing a format of at least one media input in the subset to a format that is compatible with the capabilities of the device used to receive the subset of the media inputs prior to delivering the subset of the media inputs to the responder.

4. The method of claim 2 further comprising applying, to the information bundle, the capabilities of the device used to receive the subset of the media inputs to exclude media inputs from the subset that are not compatible with the capabilities of the device used to receive the subset of the media inputs.

5. The method of claim 1 further comprising:

for each responder in the plurality of responders:

determining a location of the responder; and customizing the set of media inputs to the location of the responder.

6. The method of claim 1, wherein applying the set of filtering templates to the information bundle comprises changing a format of at least one of the plurality of media inputs to a different format before including the media input in the subset of media inputs delivered to the responder.

7. The method of claim 1, wherein the plurality of media inputs comprising the incident information bundle includes data from a request for assistance from a public entity.

8. The method of claim 7, wherein the request for assistance is placed through a Next Generation 9-1-1 (NG-911) service infrastructure.

9. The method of claim 1, wherein at least one of the media inputs in the subset comprises a reference to media or a reference to a media source.

10. A system for selectively distributing media associated with an incident to a plurality of responders assigned to the incident, the system comprises:

a network interface configured to receive an incident information bundle comprising a plurality of media inputs associated with an incident, wherein the incident comprises a natural calamity, a fire, riots, or a terror attack;

for each responder in the plurality of responders assigned to the incident, a processor configured to:

determine a role for the responder, wherein the role comprises a particular job for a police officer or comprises a particular job for a fire department personnel;

select a set of filtering templates designed based on the set of roles;

apply the set of filtering templates to the information bundle to generate a responder information bundle comprising a subset of the media inputs that is customized to the set of roles for the responder, wherein at least one of the media inputs is changed to a different format prior to being included in the subset of the media inputs; and deliver the responder information bundle to the responder, wherein the responder comprises a police officer or fire department personnel.

11. The system of claim 10 further comprises a memory coupled to the processor, the memory including a master record for the incident, wherein the master record includes the plurality of media inputs.

12. The system of claim 10, wherein the system comprises a public emergency communication service.

13. The system of claim 12, wherein the public emergency communication service is Next Generation 9-1-1 (NG-911) service infrastructure.

* * * * *